United States Patent
Brooks et al.

(10) Patent No.: US 10,228,939 B2
(45) Date of Patent: Mar. 12, 2019

(54) EFFICIENT CONVERSION OF NUMBERS FROM DATABASE FLOATING POINT FORMAT TO BINARY INTEGER FORMAT

(71) Applicant: Oracle International Corporation, Redwood City, CA (US)

(72) Inventors: Jeffrey S. Brooks, Austin, TX (US); Austin Lee, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 40 days.

(21) Appl. No.: 15/378,701

(22) Filed: Dec. 14, 2016

(65) Prior Publication Data

US 2018/0165093 A1 Jun. 14, 2018

(51) Int. Cl.
G06F 7/00 (2006.01)
G06F 9/30 (2018.01)

(52) U.S. Cl.
CPC ...... G06F 9/30025 (2013.01); G06F 9/30014 (2013.01)

(58) Field of Classification Search
None
See application file for complete search history.

(56) References Cited

U.S. PATENT DOCUMENTS

| | | | |
|---|---|---|---|
| 5,764,548 A | 6/1998 | Keith | |
| 6,151,612 A | 11/2000 | Song | |
| 6,292,815 B1 | 9/2001 | Abdallah | |
| 6,633,895 B1 * | 10/2003 | Bass | G06F 7/4991 708/498 |
| 6,684,232 B1 * | 1/2004 | Handlogten | G06F 7/483 708/204 |
| 7,707,233 B2 | 4/2010 | Cornea-Hasegan | |
| 8,977,663 B2 * | 3/2015 | Lee | G06F 7/491 708/204 |
| 9,311,050 B2 | 4/2016 | Olsen | |
| 9,507,564 B2 * | 11/2016 | Brooks | G06F 7/483 |
| 9,747,073 B2 * | 8/2017 | Brooks | G06F 7/483 |
| 2013/0246490 A1 * | 9/2013 | Lee | G06F 7/491 708/204 |
| 2015/0254065 A1 * | 9/2015 | Brooks | G06F 7/483 708/204 |
| 2015/0293747 A1 * | 10/2015 | Brooks | G06F 7/483 708/495 |
| 2017/0046128 A1 * | 2/2017 | Brooks | G06F 7/483 |
| 2017/0322768 A1 * | 11/2017 | Brooks | G06F 7/483 |
| 2018/0165093 A1 * | 6/2018 | Brooks | G06F 9/30014 |

\* cited by examiner

*Primary Examiner* — David H Malzahn
(74) *Attorney, Agent, or Firm* — Meyertons, Hood, Kivlin, Kowert & Goetzel, P.C.

(57) ABSTRACT

Embodiments of a processing pipeline for converting numbers formatted in a machine independent format to a machine compatible format are disclosed. In response to execution of a conversion instruction, the processing pipeline may convert each digit of a number in a machine independent format number to generate converted digits. Using the converted digits, the processing pipeline may generate multiple intermediate products. The processing pipeline may then combine the intermediate products to generate a result number that is formatted with a machine compatible format.

14 Claims, 7 Drawing Sheets

EFFICIENT CONVERSION OF NUMBERS FROM DATABASE FLOATING POINT FORMAT TO BINARY INTEGER FORMAT

BACKGROUND

Technical Field

This invention relates to integrated circuits, and more particularly, to processors and floating point number units.

Description of the Related Art

Processors, or processor cores, are used in in a variety of applications ranging from desktop computers to cellular telephones. In some applications, multiple processors or processor cores, may be connected together so that computation tasks may be shared among the various processors. Whether used individually, or as part of group, processors make use of sequential logic circuits, internal memory, and the like, to execute program instructions and operate on input data, which may be represented in a binary numeral system.

One particular application in which processors or processor cores are used is database processing. Software instructions executed by a processor or processor core may allow for the analysis of large of amounts of data in a database, such as, e.g., financial data. Such databases may be stored in one or more storage devices included in a computing system, and may include numbers, such as, e.g., amounts of money or the like, as well as other related information. Different databases may store numbers in different formats dependent upon characteristics of a particular database.

In analyzing data included in a database, a processor or processor core may retrieve portions of the data from the database, format the retrieved data, and store the formatted data in memory of the computing system for additional processing. To facilitate such retrieval, formatting, and analysis, some processors or processor cores may employ coprocessors, or other dedicated hardware, to perform more complicated arithmetic operations, such as, floating-point multiplication for example. Such coprocessors may be fabricated on a separate integrated circuit chip, or may be included as a separate functional block within a processor. While the use of dedicated arithmetic hardware may result in improved computation performance in some database applications, the format of numbers being processed may be specific to a particular database. In such cases, additional program instructions may be required to allow different processor or processor core hardware configurations to operate on data included in a particular database.

SUMMARY

Various embodiments of an apparatus and a method for processing machine independent number formats are disclosed. Broadly speaking, a method and apparatus are contemplated in which an instruction fetch unit included in a processor may be configured to receive a plurality of program instructions, and a load store unit included in the processor may be configured to, in response to an execution of one or more of the plurality of program instructions, retrieve a number from a storage system, where the number includes a plurality of digits, each with a first format. A pipeline of logic circuits included in the processor may be configured to, in response to an execution of a conversion instruction included in the plurality of program instructions, convert the plurality of digits from the first format to a second format to generate a plurality of converted digits, and generate a plurality of intermediate products using the plurality of converted digits. The pipeline of logic circuits may be further configured to combine the plurality of intermediate products to generate a result number formatted with a third format.

In a non-limiting embodiment, the pipeline of logic circuits may be further configured to perform a two's complement operation on the result number in response to determining the number is less than zero.

In one implementation, the pipeline of logic circuits may be further configured to replace the result number with a constant value in response to detecting an overflow or underflow condition.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

DETAILED DESCRIPTION OF EMBODIMENTS

In a computing system, numeric values may be stored and processed using various encodings of bit patterns. As such different processor implementations may have different representations of a given numeric value. Moreover some processors may allow for multiple representations of numbers and the various representations may be not be compatible between different computing systems.

In some computing applications, such as, e.g., database processing, numbers may be stored in a format that is independent of processor architecture so that the database may be used across different hardware platforms. When accessing a database with numbers stored in such a machine independent format, a processor may convert the machine independent format into a format native to the processor. In some cases, the format changes are handled through the execution of program instructions. When a number in a machine independent format is retrieved from a database, multiple program instructions are executed to convert the number into a native format for the processor. The result number may then be stored in memory to allow further processing, such as, e.g., performing arithmetic operations on numbers retrieved from the database.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

While executing the program instructions to convert a machine independent number into a native format for a particular processor, the processor may be limited as to other computing tasks that may be performed, thereby limiting the overall performance of the processor and any associated computing system. Moreover, the repeated execution of the program instructions used in converting numbers may increase power consumption. The embodiments illustrated in the drawings and described below may provide techniques for converting numbers from a machine independent format to a native number format for a particular processor without a loss of computing performance and limiting power consumption associated with the conversion.

Figure 1:
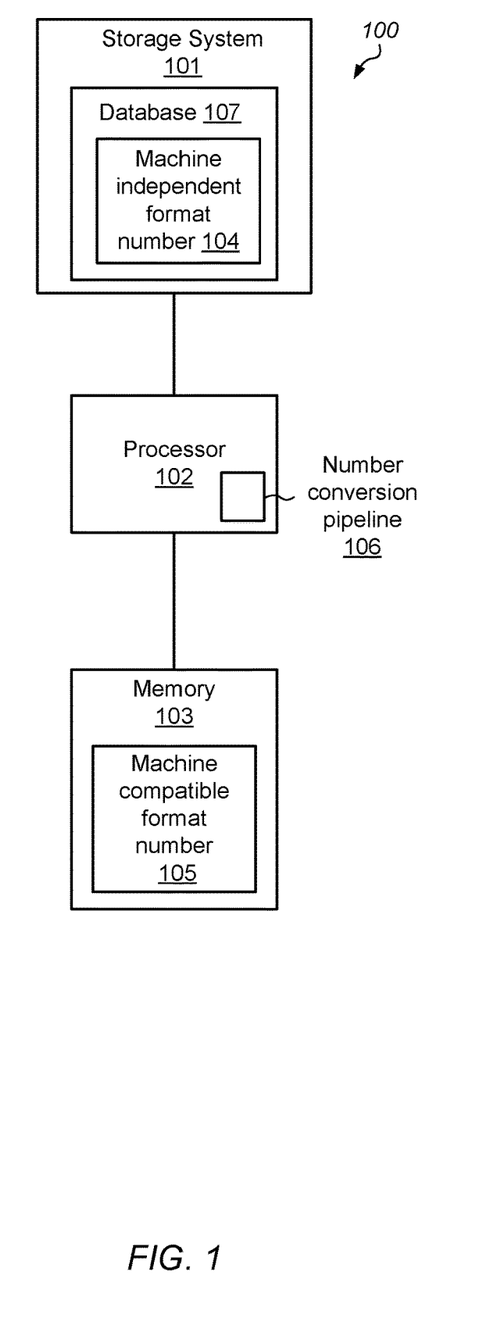
FIG. 1 is a block diagram of an embodiment of a computing system.

A computing system capable of processing a database is illustrated in the block diagram depicted in FIG. 1. In the illustrated embodiment, computing system 100 includes processor 102, which is coupled to memory 103, and storage system 101 storing database 107.

Storage system 101 may be designed according to one of various design methodologies. For example, in some embodiments, storage system 101 may include multiple hard-disk drives, flash drives, or any other suitable combination of mass storage components.

In various embodiments, storage system 101 may be configured to store data to be used by or generated by computing system 100. For example, in the present embodiment, database 107 is stored on storage system 101. Database 107 is representative of any suitable type of database, such as, an accounting or financial database, and may store multiple numeric values. As described below in more detail, numeric values included in database 107 may be stored in a machine independent format to allow for the database 107 to be used by processors or processor cores with different internal architectures than processor 102.

As described below in more detail, processor 102 may be a general-purpose processor configured to execute program instructions, or any other dedicated processing circuit. Processor 102 includes number conversion pipeline 106. In various embodiments, number conversion pipeline 106 may be configured to, in response to execution of an instruction by processor 102, convert a number from a machine independent format to a machine compatible format, and store the result in memory 103. For example, in the present embodiment, number conversion pipeline 106 may convert machine independent format number 104 included in database 107 to machine compatible format number 105, and store machine compatible format number 105 in memory 103. In various embodiments, machine compatible format number 105 may be compatible with arithmetic circuits included in processor 102.

The concept of a processor "pipeline" is well understood, and refers to the concept of splitting the "work" a processor performs on instructions into multiple stages. In one embodiment, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction and/or operations associated with the instruction on to other stages for further processing.

Memory 103 may include one or more memory devices of any suitable type configured to store data, such as, machine compatible format number 105. Additionally, memory 103 may store multiple program instructions to be executed by processor 102. In some embodiments, such program instructions may include a conversion instruction that, when executed by processor 102, causes number conversion pipeline 106 to convert a number from a machine independent format to a machine compatible format.

It is noted that the embodiment depicted in FIG. 1 is merely an example. In other embodiments, different components and different arrangements of components are possible and contemplated.

When numbers, such as, e.g., machine independent format number 104 as illustrated in FIG. 1, are stored in database, the numbers are stored as a grouping of bits commonly referred to as a computer number format. Various encodings between a numeric value and a corresponding bit pattern are possible, and may depend on a particular database or be compatible with circuitry included in a particular processor or processor core. As such, different databases may have different bit representations for the same number.

Some processors may allow for multiple representations of numbers (also referred to herein as number formats). The choice of how a given number is represented within a processor may be controlled by software. For example, a user may elect to have a certain variable within a software program stored as a fixed-point number where a fixed number of bits are used to store the integer and fractional portions of a number. For example, in a 32-bit wide processor, 16-bits may be used to store the integer portion of a number, and 16-bits may be used to store the fractional portion of the number.

To allow for a greater range of numbers to be represented within a processor, a floating-point number format may be employed. A floating-point number format may include a series of bits encoding a mantissa (or significand), a series of bits encoding an exponent, and a sign bit. Using the mantissa, exponent, and sign together, a wide range of precision numbers may be represented within a processor. Various floating-point number formats are possible, such as, Institute of Electrical and Electronics Engineers (IEEE) 754-2008 standard.

Figure 2:
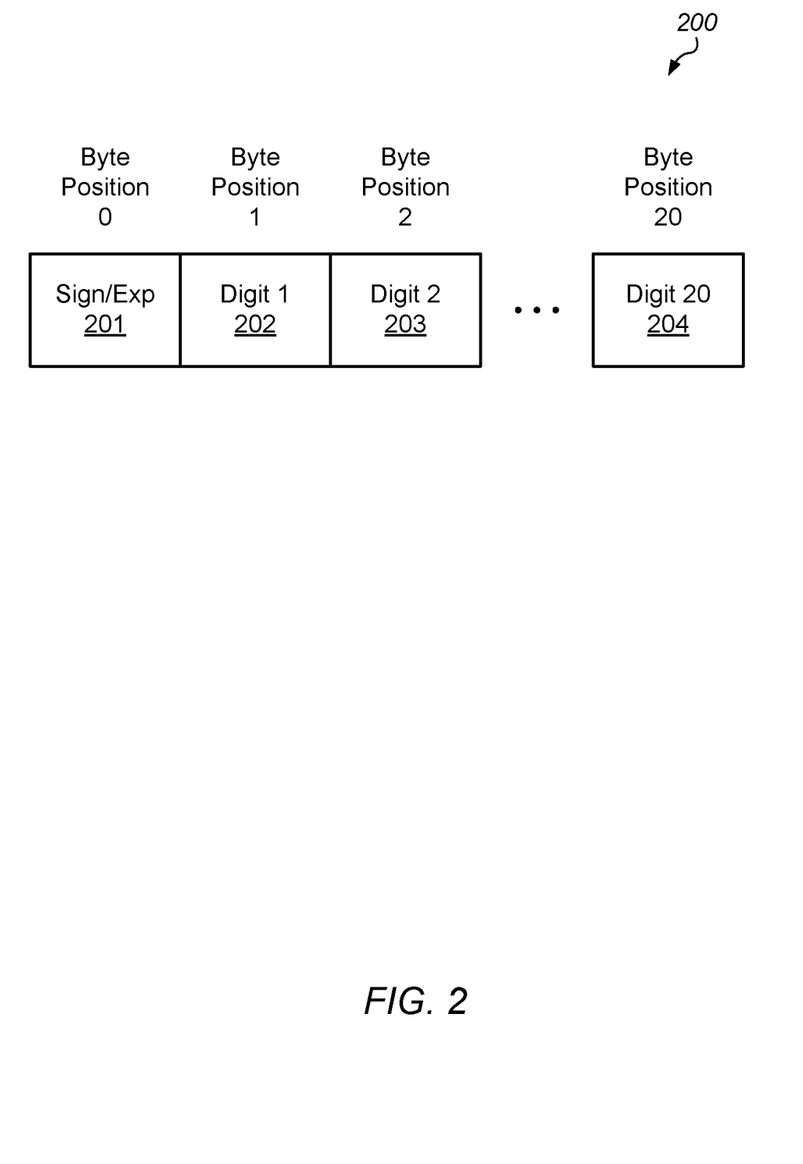
FIG. 2 is a block diagram depicting an embodiment of a number format.

In some cases, numbers stored in a database may be in a format that is incompatible with the circuitry in a processor. The numbers may need to be converted into a format that the circuitry in a processor can accommodate through the execution of multiple software instructions. To remediate such issues, a hardware independent number format may be employed for the numbers in the database. A block diagram depicting an embodiment of a machine-independent number format is illustrated in FIG. 2. In the illustrated embodiment, a numeric value is represented by a number of mantissa bytes (digit block 202 through digit block 204), and sign/exponent byte (sign/exp block 201). The number of digit blocks may be stored in a byte of data separate from the number (not shown). Each of the digit blocks, and the sign/exponent block, occupy a respective one of multiple ordered byte positions. Although 20 byte positions are depicted in the embodiment of FIG. 2, in other embodiments, any suitable number of ordered byte positions may be employed.

Each mantissa byte (also referred to herein as a "digit" or "mantissa digit") may encode a single digit between 0 and 99 of the numeric values mantissa. It is noted that each mantissa digit may include any suitable number of data bits that may be needed for the encoding scheme employed, and that an implied radix exists between the digits occupying byte position 1 and byte position 2. Each digit may, in various embodiments, correspond to a base-100 value between 0 and 99, respectively, resulting in an inherent addition of one into each mantissa byte. A negative number encoded in such a format may include digits, which are in a complement form, and have values between 2 and 101. In some embodiments, subtracting the digit from a value of 102 may create a complement of a digit.

The number format depicted in FIG. 2 may provide a machine-independent representation of floating point numbers. Numbers formatted in such a manner may be treated as a stream of bytes and be ported to different processors, while retaining their real value, thereby ensuring the a particular calculation will have the same result on multiple different hardware platforms. The use of a number such as the one depicted by the block diagram of FIG. 2 may, in some embodiments, allow high storage density of numbers in a database, as well as allow for sorting, and comparing of numbers on a byte basis.

It is noted that the block diagram illustrated in FIG. 2 is merely an example. In other embodiments, different numbers of digits and different encoding schemes may be employed.

Figure 3:
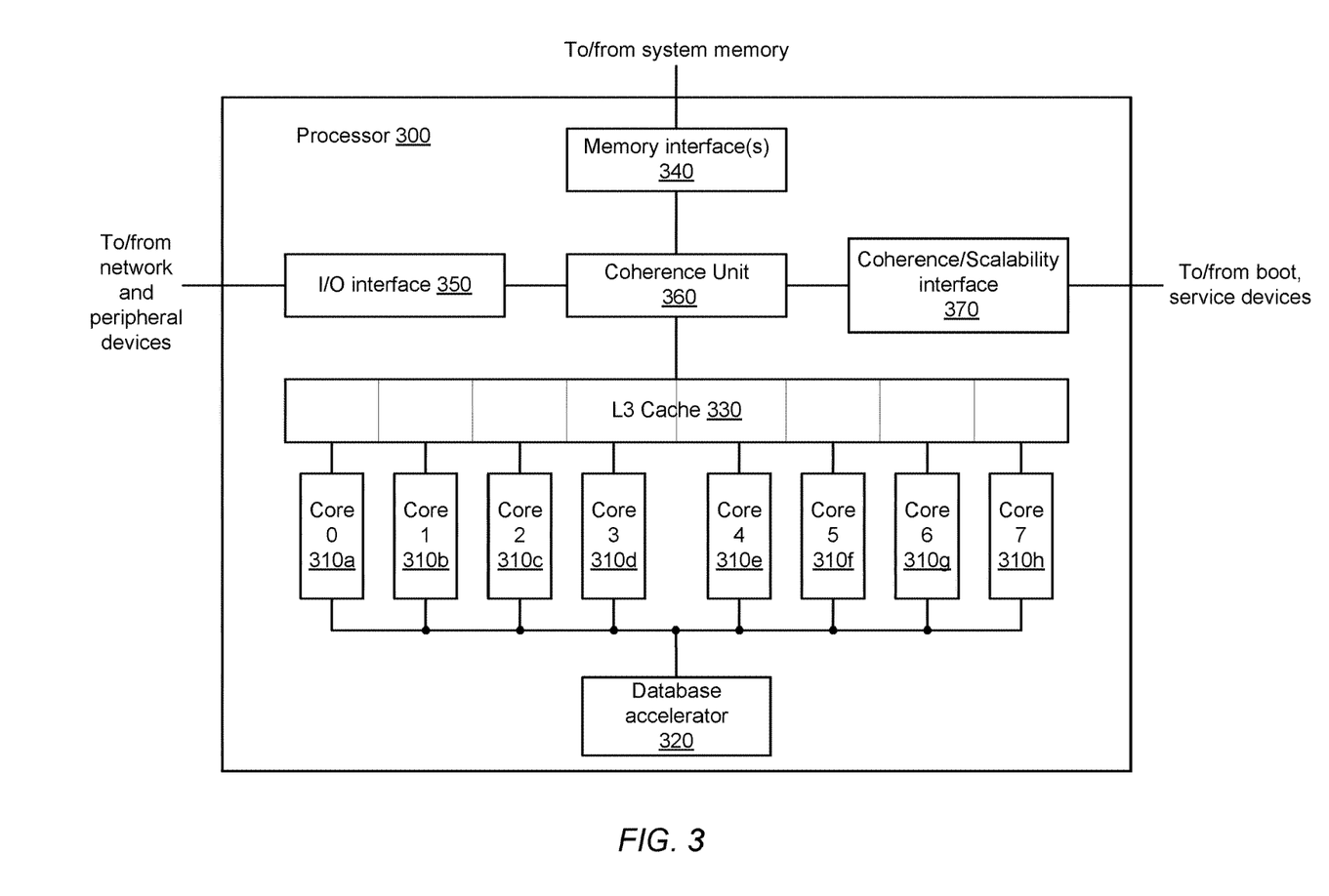
FIG. 3 is a block diagram of an embodiment of a processor.

A block diagram illustrating one embodiment of a multithreaded processor 300 is shown in FIG. 3. In some embodiments, processor 300 may correspond to processors 102 as depicted in FIG. 1. In the illustrated embodiment, processor 300 includes a plurality of processor cores 310a-h, which are also designated "core 0" though "core 7." It is noted that although 8 cores are shown, in various embodiments, any suitable number of processor cores may be employed. Each of cores 310 is coupled to L3 cache 300. L3 cache 330 is coupled to coherence unit 360, which is in turn coupled to input/output (I/O) interface 350, coherence/scalability interface 370. Additionally, coherence unit 360 is coupled to one or more memory interface(s) 340, which are coupled in turn to one or more banks of system memory (not shown). In various embodiments, such system memory may include any suitable type of memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example.

As described in greater detail below, I/O interface 350 may couple processor 300 to peripheral devices, and a network. Coherence/scalability interface 370 may couple processor 300 to boot and/or service devices. In some embodiments, the elements included in processor 300 may be fabricated as part of a single integrated circuit (IC), for example on a single semiconductor die.

Cores 310a-h may be configured to execute instructions and to process data according to a particular instruction set architecture (ISA). In one embodiment, cores 210 may be configured to implement the SPARC® V9 ISA. In the illustrated embodiment, each of cores 310a-h may be configured to operate independently of the others, such that all cores 310a-h may execute in parallel. Additionally, in some embodiments each of cores 310a-h may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core may also be referred to as a multithreaded (MT) core. In one embodiment, each of cores 310a-h may be configured to concurrently execute instructions from eight threads, for a total of 64 threads concurrently executing across processor 300. In other embodiments, however, it is contemplated that other numbers of cores 310a-h may be provided, and that cores 310a-h may concurrently process different numbers of threads.

L3 cache 330 may be configured to cache instructions and data for use by cores 310a-h. In the illustrated embodiment, L3 cache 330 may be organized into eight separately addressable banks that may each be independently accessed, such that in the absence of conflicts, each bank may concurrently return data to a respective one of cores 310a-h. In some embodiments, each individual bank may be implemented using set-associative or direct-mapped techniques. For example, in one embodiment, L3 cache 330 may be a 48 megabyte (MB) cache, where each bank is 16-way set associative with a 64-byte line size, although other cache sizes and geometries are possible and contemplated. L3 cache 230 may be implemented in some embodiments as a writeback cache, in which written (dirty) data may not be written to system memory until a corresponding cache line is evicted.

Memory interface 340 may be configured to manage the transfer of data between L3 cache 330 and system memory, for example, in response to L3 fill requests and data evictions. In some embodiments, multiple instances of memory interface 340 may be implemented, with each instance configured to control a respective bank of system memory. Memory interface 340 may be configured to interface to any suitable type of system memory, such as described above. In some embodiments, memory interface 340 may be configured to support interfacing to multiple different types of system memory.

In the illustrated embodiment, processor 300 may also be configured to receive data from sources other than system memory. I/O interface 350 may be configured to provide a central interface for such sources to exchange data with cores 310a-h and/or L3 cache 330 via coherence unit 360. In some embodiments, I/O interface 350 may be configured to coordinate Direct Memory Access (DMA) transfers of data between external peripherals and system memory via coherence unit 260 and memory interface 240.

I/O interface 350 may be configured to coordinate data transfer between processor 300 and one or more peripheral devices. Such peripheral devices may include, without limitation, a storage system include one or more storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, I/O interface 350 may implement one or more instances of an interface such as Peripheral Component Interface Express (PCI Express™), although it is contemplated that any suitable interface standard or combination of standards may be employed. For example, in some embodiments I/O interface 250 may be configured to implement a version of Universal Serial Bus (USB) protocol or IEEE 1394 (Firewire®) protocol in addition to or instead of PCI Express™.

I/O interface 350 may also be configured to coordinate data transfer between processor 200 and one or more devices (e.g., other computer systems) coupled to processor 200 via a network. In one embodiment, I/O interface 350 may be configured to perform the data processing in order to implement an Ethernet (IEEE 802.3) networking standard such as Gigabit Ethernet or 10-Gigabit Ethernet, for example, although it is contemplated that any suitable networking standard may be implemented. In some embodiments, I/O interface 350 may be configured to implement multiple discrete network interface ports.

It is noted that the embodiment illustrated in FIG. 3 is merely an example. In other embodiments, different numbers of circuits blocks, and different configurations of circuit blocks may be employed.

Figure 4:
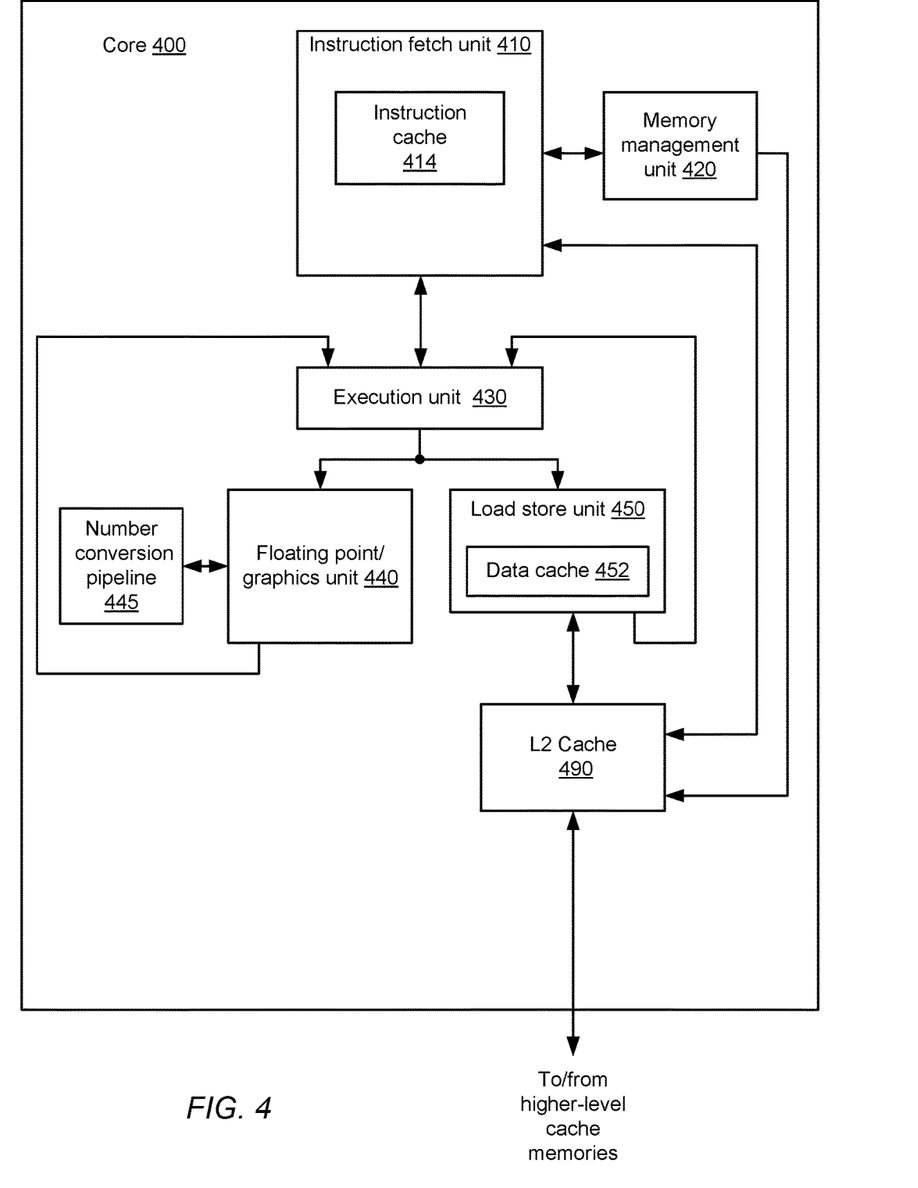
FIG. 4 is a block diagram of an embodiment of a processor core.

A possible embodiment of a processor core is illustrated in FIG. 4. In the illustrated embodiment, core 400 includes an instruction fetch unit (IFU) 410 coupled to a memory management unit (MMU) 420, a L2 cache memory 490, and execution unit 430. Execution unit 430 is coupled to both a floating point/graphics unit (FGU) 440 and a load store unit (LSU) 450. Each of the latter units is also coupled to send data back to execution unit 430. FGU 440 is also coupled to number conversion pipeline 445.

Instruction fetch unit 410 may be configured to provide instructions to the rest of core 400 for execution. In the illustrated embodiment, IFU 410 may be configured to perform various operations relating to the fetching of instructions from cache or memory, the selection of instructions from various threads for execution, and the decoding of such instructions prior to issuing the instructions to various functional units for execution. Instruction fetch unit 410 further includes an instruction cache 414. In one embodiment, IFU 410 may include logic to maintain fetch addresses (e.g., derived from program counters) corresponding to each thread being executed by core 400, and to coordinate the retrieval of instructions from instruction cache 414 according to those fetch addresses.

Execution unit 430 may be configured to execute and provide results for certain types of instructions issued from IFU 410. In one embodiment, execution unit 430 may be configured to execute certain integer-type instructions defined in the implemented ISA, such as arithmetic, logical, and shift instructions. It is contemplated that in some embodiments, core 400 may include more than one execution unit 430, and each of the execution units may or may not be symmetric in functionality. Finally, in the illustrated embodiment instructions destined for FGU 440 or LSU 450 pass through execution unit 430. In alternative embodiments, however, it is contemplated that such instructions may be issued directly from IFU 410 to their respective units without passing through execution unit 430.

Floating point/graphics unit 440 may be configured to execute and provide results for certain floating-point and graphics-oriented instructions defined in the implemented ISA. For example, in one embodiment FGU 440 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 440 may implement partitioned-arithmetic and graphics-oriented instructions defined by a version of the SPARC® Visual Instruction Set (VIS™) architecture, such as VIS™ 2.0. Additionally, in one embodiment FGU 440 may implement certain integer instructions such as integer multiply, divide, and population count instructions, and may be configured to perform multiplication operations. Depending on the implementation of FGU 440, some instructions (e.g., some transcendental or extended-precision instructions) or instruction operand or result scenarios (e.g., certain denormal operands or expected results) may be trapped and handled or emulated by software.

In the illustrated embodiment, FGU 440 may be configured to store floating-point register state information for each thread in a floating-point register file. In one embodiment, FGU 440 may implement separate execution pipelines for floating point add/multiply, divide/square root, and graphics operations, while in other embodiments the instructions implemented by FGU 440 may be differently partitioned. In various embodiments, instructions implemented by FGU 440 may be fully pipelined (i.e., FGU 440 may be capable of starting one new instruction per execution cycle), partially pipelined, or may block issue until complete, depending on the instruction type.

As described below in more detail, number conversion pipeline 445 may be configured to execute and provide results in response to execution of a conversion instruction included within the implemented ISA. The conversion instruction may, in various embodiments, be directed towards the processing of both fixed and variable length machine independent numbers, and replace the execution of high-level software subroutines intended to convert number formats. Such numbers may be used in various applications, such as, e.g., databases, to allow numbers to be shared across different hardware platforms. Number conversion pipeline 445 may be included within FGU 440 or, in other embodiments, number conversion pipeline 445 may be a separate functional block.

In some embodiments, the special instruction may allow for a target exponent (TE) argument, which specifies a desired base-100 output exponent such that Equation 1 is satisfied. By providing a TE argument, multiple numbers may be converted into machine specific numbers, each with a common exponent value. In various embodiments, a value of zero for TE may result in format conversion without adjusting the output exponent.

$$\text{output\_value} \times 100^{TE} = \text{input\_value} \qquad (1)$$

In the illustrated embodiment, number conversion pipeline 445 may be configured to change formats of, or clear (i.e., set to zero) individual mantissa bytes within machine independent numbers. Number conversion pipeline 445 may include dedicated logic circuits for performing addition, multiplication, and the like. In other embodiments, number conversion pipeline 445 may share arithmetic circuitry with another floating-point unit, such as, FGU 440, for example.

Load store unit 450 may be configured to process data memory references, such as integer and floating-point load and store instructions as well as other memory requests. In some embodiments, LSU 450 may also be configured to assist in the processing of instruction cache 414 misses originating from IFU 410. LSU 450 may include a data cache 452 as well as logic configured to detect cache misses and to responsively request data from L2 cache 490. In one embodiment, data cache 452 may be configured as a write-through cache in which all stores are written to L2 cache 490 regardless of whether they hit in data cache 452.

L2 cache memory 490 may be configured to cache instructions and data for use by execution unit 430. In the illustrated embodiment, L2 cache memory 490 may be organized into multiple separately addressable banks that may each be independently accessed. In some embodiments, each individual bank may be implemented using set-associative or direct-mapped techniques.

L2 cache memory 490 may be implemented in some embodiments as a writeback cache in which written (dirty) data may not be written to system memory until a corresponding cache line is evicted. L2 cache memory 490 may variously be implemented as single-ported or multiported (i.e., capable of processing multiple concurrent read and/or write accesses). In either case, L2 cache memory 490 may implement arbitration logic to prioritize cache access among various cache read and write requestors. In the event of cache miss on L2 cache memory 490, the request may be forwarded to a higher-level cache, such as, e.g., L3 cache 330 as illustrated in FIG. 3.

MMU 420 may be configured to manage one or more address translation tables stored in system memory and to traverse such tables (which in some embodiments may be hierarchically organized) in response to a request for an address translation, such as from an ITLB or DTLB miss. In some embodiments, if MMU 420 is unable to derive a valid address translation, for example if one of the memory pages including a page table is not resident in physical memory (i.e., a page miss), MMU 420 may be configured to generate a trap to allow a memory management software routine to handle the translation.

It is noted that embodiment depicted in FIG. 4 is merely an example, and that some circuit blocks have been omitted for clarity. In other embodiments, different circuit blocks and different arrangements of circuit blocks are possible and contemplated.

Figure 5:
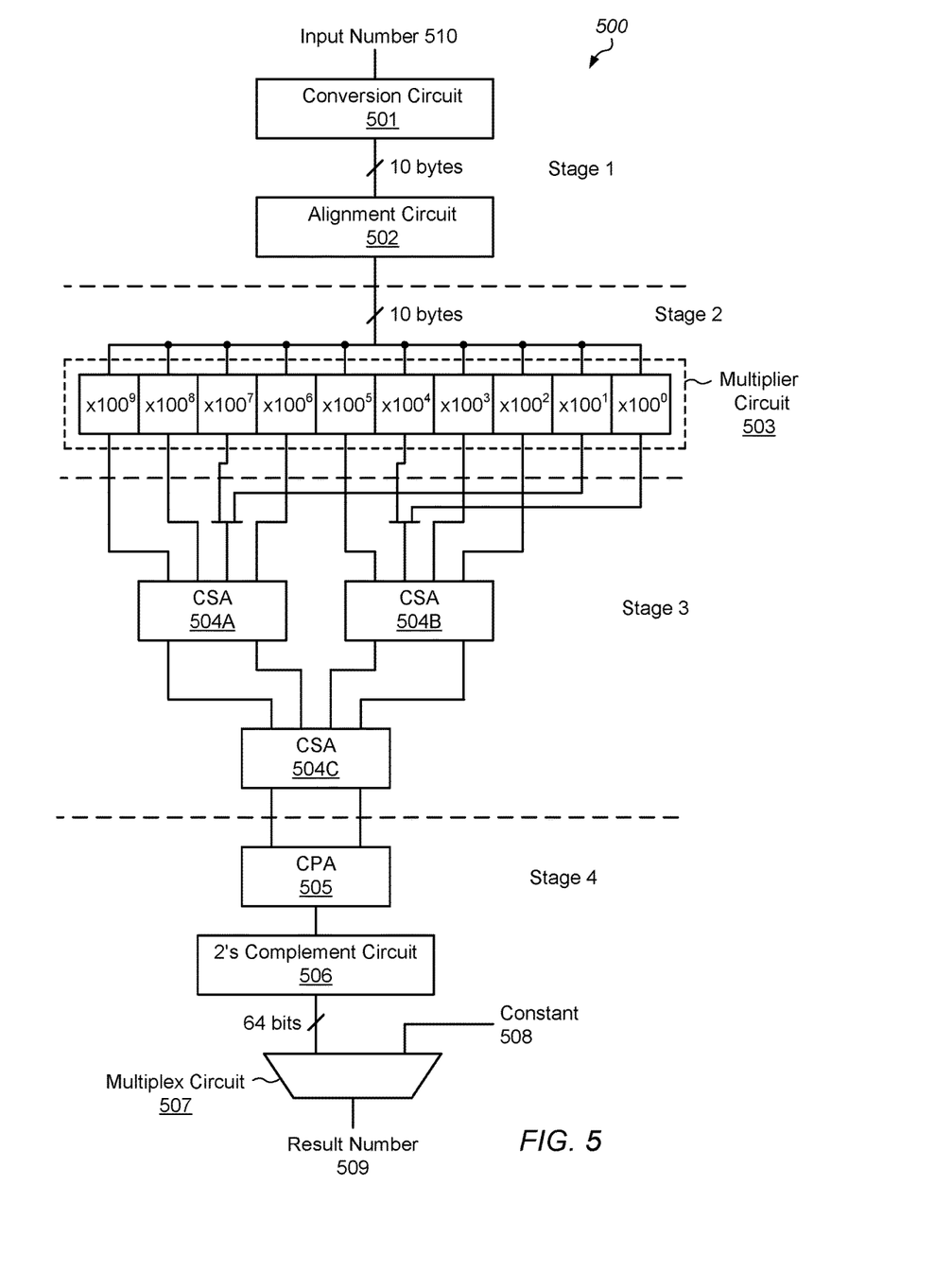
FIG. 5 illustrates a block diagram of an embodiment of a number conversion pipeline.

An embodiment of a number conversion pipeline is depicted in the block diagram of FIG. 5. In the illustrated embodiment, number conversion pipeline 500 includes four stages, each of which includes circuits configured to perform a particular portion of the conversion process. By employing a pipeline structure, different stages of the pipeline may be working on different numbers in parallel allowing for high utilization of the conversion circuits when converting multiple numbers.

Stage 1 includes conversion circuit 501 coupled to alignment circuit 502. In various embodiments, conversion circuit 501 may include circuits configured to convert each digit of input number 510 into an intermediate format. For example, in some embodiments, conversion circuit 501 may convert digits of input number 510 from Oracle number format to binary-coded centimal (BCC). In such cases, conversion circuit 501 may be configured to complement negative digits included in input number 510, as well as subtracting a one from each digit.

Additionally, conversion circuit 501 may clear unused bytes included in input number 510 as such bytes may have an unknown value upon retrieval from memory. In some cases, conversion circuit 501 may clear a terminating 102 byte, if present. Although conversion circuit 501 is depicted in FIG. 5 as generating an intermediate format number including 10 bytes, in other embodiments, conversion circuit 501 may generate an intermediate format number including any suitable number of bytes based on a size of input number 510.

As used and described herein, BCC is an encoding scheme in which two decimal digits are stored in a single binary byte. A value of binary byte may represent a number ranging from 0 to 255, so the binary byte may be used to store two decimal digits from 0 to 99 as a base-100 value.

Once input number 510 has been converted into the intermediate format, alignment circuit 502 may be configured to perform a shift using a shift count value to align the mantissa of the number in its intermediate format. In various embodiments, alignment circuit 502 may include a shift register, or other suitable circuit, configured to perform a right shift on the mantissa digit of the number in its intermediate format. It is noted that a number of bytes output by alignment circuit 502 is dependent upon a number of bytes included in the intermediate format number output from conversion circuit 501.

In stage 2, multiplier circuit 503 further converts the digits of the intermediate number. In some embodiments, multiplier circuit 503 converts the 10 base-100 mantissa digits into binary integer magnitude values to create 10 intermediate products. The conversion may be accomplished by multiplying each digit by a corresponding power of 100 (also referred to herein as a corresponding "weight").

Multiplier circuit 503 may include individual multiplier circuits, each of which may be designed according to one of various design styles, such as, a Booth multiplier, for example. Although multiplier circuits are specifically referenced in the embodiment of FIG. 5, in other embodiments, any suitable method of multiplication, such as, e.g., successive addition, may be employed.

In some cases, multiplier circuit 503 may be organized to improve performance and reduce the area and power consumption associated with the circuits. For example, since BCC digits cannot exceed a value of 99 (values of 100 to 255 are invalid), the multiplication may be performed on only 7-bits, not the full 8-bits included in a given digit. Additionally, the most significant BCC digit cannot exceed a value of 9, so the most significant BCC digit may be represented by 4-bits instead of 7-bits or 8-bits.

Some of intermediate products may have least significant bits that are known to be 0 based on multiplying by the corresponding weight. Knowing this, some intermediate products may be merged together as shown in FIG. 5 may exploit the space occupied by such least significant bits. For example, the output of the multiplier with weight $100^1$ may be merged with the output of the multiplier with weight $100^7$. It is noted that such a merging is merely an example, and that, in other embodiments, different intermediate products may be merged in different ways to achieve desired area and performance goals for multiplier circuit 503.

In Stage 3 of number conversion pipeline 500, the intermediate products are further combined using carry-save adders (CSAs). Specifically, CSA 504A and CSA 504B each combine four intermediate products to generate respective sum and carry values. The results sum and carry values are further combined by CSA 504C to generate another sum and carry value, effectively reducing the number of intermediate products down to two.

As used and described herein, a CSA is an adder circuit configured to perform binary addition on two numbers, and output the resultant sum as well as the carry value resulting from the addition. The CSA circuits described herein may be designed according to one of various design styles, and may include any suitable combination of dynamic and/or static logic gates.

In stage 4 of number conversion pipeline 500, the outputs of CSA 504C are combined to generate a single intermediate product using a carry-propagate adder (CPA). As used and described herein, a CPA is an adder in which a sum of a particular pair of bits from the two addends, is dependent upon a carry value from a sum of a pair of lower order bits. In the illustrated embodiment, CPA 505 combines the outputs of CSA 504C into a single intermediate product.

2's complement circuit 506 may then process the output of CPA 505 depending upon the sign of input number 510. If input number 510 is negative, then 2's complement circuit 506 may invert each bit of the output of CPA 505 and add 1 to generate a two's complement version of the output of CPA 505. In various embodiments, 2's complement circuit 506 may include any suitable combination of logic gates, latches, flip-flops, and the like configured to perform the two's complement operation. It is noted that in the case when a 10-byte input number is to be converted the output of 2's complement circuit 506 may be a 64-bit number.

Stage 4 also includes a circuit block for dealing with overflow and underflow cases. Multiplex circuit 507 may selectively choose between the output of 2's complement circuit 506 and constant 508. For example, if there is neither an underflow or overflow condition, then multiplex circuit 507 may pass the output of 2's complement circuit 506 to result number 509, which may be a signed 64-bit binary integer. Alternatively, if an overflow or underflow condition has been detected during the conversion process, multiplex circuit 507 may selectively pass constant 508 to result number 509. In various embodiments, constant value 508 may correspond to a designate value indicative of an overflow or underflow condition.

It is noted that the embodiment depicted in FIG. 5 is merely an example. In other embodiments, different circuit blocks, and different arrangement of circuits blocks are possible and contemplated.

Figure 6:
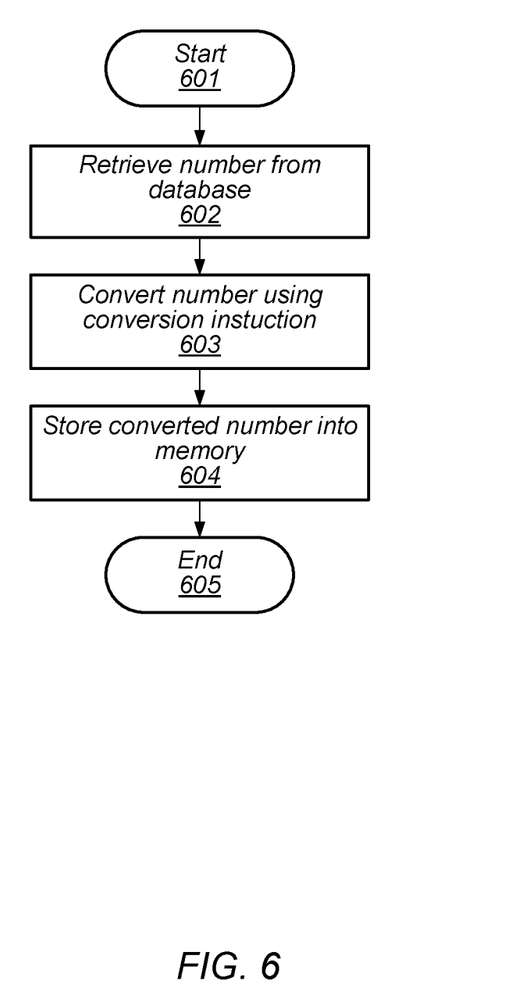
FIG. 6 illustrates a flowchart depicting an embodiment of a method for processing a database.

Turning to FIG. 6, a flow diagram depicting an embodiment of a method for processing a database is illustrated. Referring collectively to FIG. 1 and the flow diagram of FIG. 6, the method begins in block 601.

A number, such as, e.g., number 104 may be retrieved from a database stored on storage device 101 (block 602). In various embodiments, the number may be retrieved in response to the execution of one or more program instructions executed by processor 102, and may be formatted with a machine-independent format. Such instructions may be stored in memory 103 and may be included as part of an application or other software program.

The format of the retrieved number may then be converted into an alternative format using a conversion instruction (block 603). In various embodiments, number conversion pipeline 106 may, in response to execution of a conversion instruction included in the ISA of processor 102, convert the retrieved number from a machine-independent format to a format compatible with a floating-point unit included within processor 102. For example, the number may be converted into binary integer format so that processor 102 may easily process the number. By having a dedicated instruction that triggers the format conversion using specialized circuits, processor 102 may, in various embodiments, perform the format conversion with the execution of a minimum number of program instructions, thereby saving execution time and power consumption.

Once the converted number has been generated, it may be stored in memory 103 (block 604). The converted number may then be available for additional processing by processor 102 in response to executing program instructions. Since the number has already been converted into a compatible number format, the additional processing may proceed without further format changes until a result of any processing is ready to be stored into storage device 101, at which point the result may be converted into the machine-independent format.

It is noted that the embodiment of the method depicted in the flow diagram of FIG. 6 is merely an example. In other embodiments, different operations and different orders of operations may be employed.

Figure 7:
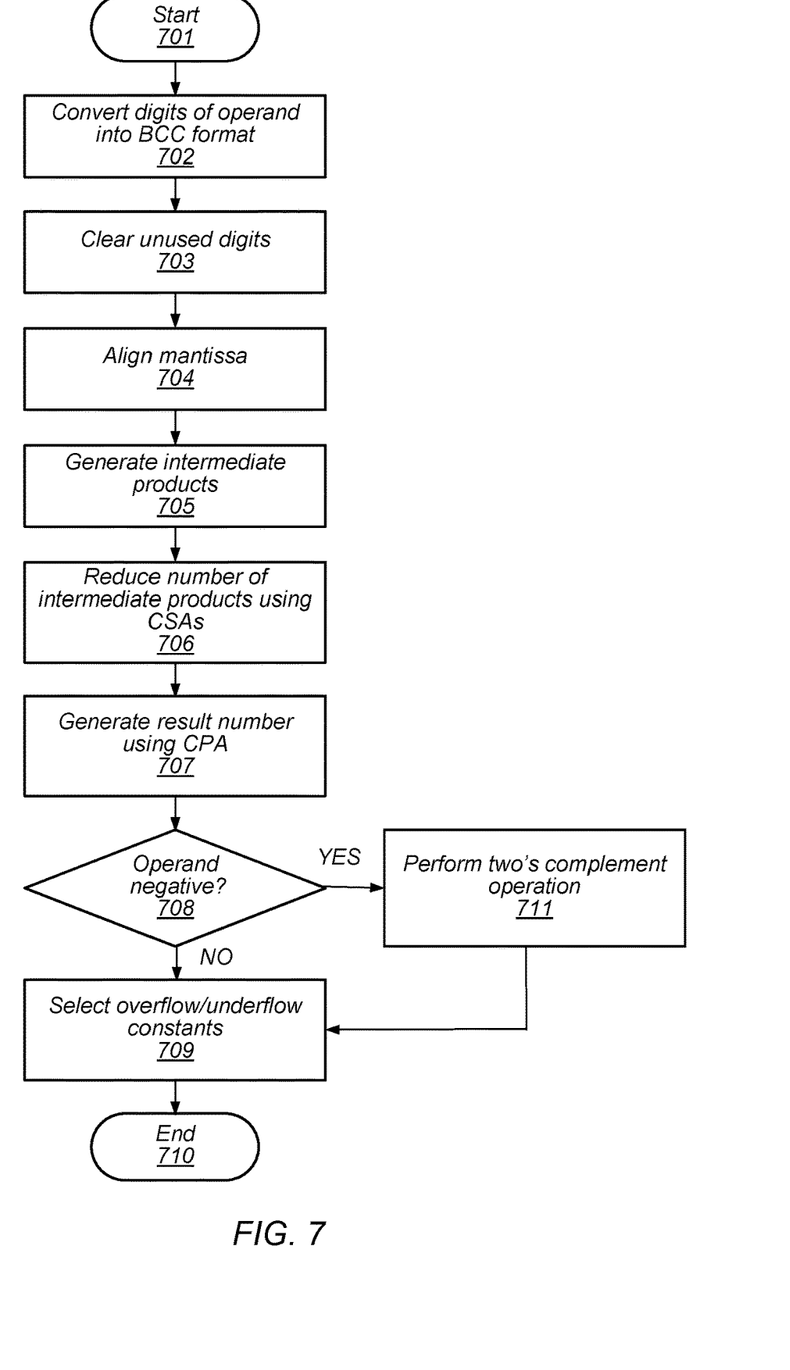
FIG. 7 illustrates a flowchart depicting an embodiment of a method for converting database numbers into a format for use with a processor or processor core.

Turning to FIG. 7, a flow diagram depicting an embodiment of a method for changing number formats is illustrated. Referring collectively to FIG. 5, and the flow diagram of FIG. 7, the method begins in block 701. It is noted that in portions of the description of the flow diagram that follows, certain numbers of mantissa digits are assumed for the purposes of illustration. In other embodiments, any suitable number of mantissa digits may be employed.

Conversion circuit 501 may receive an operand (i.e., a number from a database) formatted in a machine independent format and convert the individual digits of the numbers to a different format (block 702). In various embodiments, the machine format may be Oracle number format, and conversion circuit 501 converts the Oracle number to a BCC number. The conversion may, in some embodiments, include complementing negative digits, and subtracting the inherent +1 value included in a digit formatted in accordance with the Oracle number format.

Conversion circuit 501 may then clear unused digits in the newly formatted number (block 703). Unused digits may have an unknown value when loaded from memory, and many software programs or applications may not clear such digits prior to performing an operation. In some cases, if a terminating 102 digit is present, it may also be cleared.

Alignment circuit 502 may then align the mantissa of the formatted number (block 704). To align the mantissa, alignment circuit 502 may perform one or more right shift operations. In some cases, the mantissa digit may be right shifted by 0 to 9 bytes.

Multiplier circuit 503 may then generate multiple intermediate products (block 705). In various embodiments, then mantissa digits may be converted from base-100 values to binary integer values, which creates multiple intermediate products. For example, if there are 10 mantissa digits, the 10 intermediate products will be created by multiplying each mantissa digit by a corresponding weight. An example of the weights associated with each mantissa digit is shown in Table 1.

TABLE 1

Weights for intermediate product generation

| Digit Position | Weight |
|---|---|
| BCC_aligned_digit[01] | $100^9$ |
| BCC_aligned_digit[02] | $100^8$ |
| BCC_aligned_digit[03] | $100^7$ |
| BCC_aligned_digit[04] | $100^6$ |
| BCC_aligned_digit[05] | $100^5$ |
| BCC_aligned_digit[06] | $100^4$ |
| BCC_aligned_digit[07] | $100^3$ |
| BCC_aligned_digit[08] | $100^2$ |
| BCC_aligned_digit[09] | $100^1$ |
| BCC_aligned_digit[10] | $100^0$ |

In some cases, the number of resultant intermediate products may be reduced. For example, in the case of 10 intermediate products, the 10 intermediate products may be reduced to 8 intermediate products by identifying regions in the least significant bits that are unused, and merging other bits from a different intermediate product into those unused bits.

The number of intermediate products may then be further reduced using CSA 504A, CSA 504B, and CSA 504C (block 706). In various embodiments, CSAs 504A, 504B, and 504C add together groups of intermediate products to create a new set of intermediate products. For example, in the case of 8 intermediate products, the 8 intermediate products may be combined into a new set of 2 intermediate products.

CPA 505 may then combine the new intermediate products to generate a result number (block 707). In various embodiments, the result number may be formatted with the desired format, such as, binary integer, for example. The method may then depend the sign of the original operand (block 708).

If the original operand was positive, i.e., greater than or equal to zero, then multiplex circuit 508 may select an appropriate constant, in the event of overflow or underflow, to replace the result number (block 709). In some embodiments, if an underflow is detected in the result number, multiplex circuit 508 may select a particular constant value that may be associated with the underflow condition in the processor. Alternatively, if an overflow condition exists, multiplex circuit 508 may select a different constant associated with the overflow condition. The method may then conclude in block 710.

Alternatively, if the original operand is negative, the 2's complement circuit 507 may perform a two's complement operation on the result number (block 711). In various embodiments, the two's complement operation may include subtracting the result number from $2^N$, where N is a positive integer specifying the total number of bits in the result number. Once the two's complement operation has been performed, the method may proceed from block 709 as described above.

It is noted that the method depicted in the flow diagram of FIG. 7 is merely an example. In other embodiments, different operations and different orders of operations are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   retrieving a number from a storage device by a processor in response to executing one or more program instructions by the processor, wherein the number includes a plurality of digits each of which is formatted with a first format;
   converting, by a conversion circuit included in the processor, each digit of the plurality of digits from the first format to a second format that includes a plurality of converted digits;
   generating, generating by a multiplier circuit included in the processor, a plurality of intermediate products using the plurality of converted digits; and
   combining, by a plurality of carry-save adder circuits included in the processor, the plurality of intermediate products to generate a result number formatted with a format native to the processor.

2. The method of claim 1, further comprising in response to determining the number is less than zero, performing a two's complement operation on the result number.

3. The method of claim 1, further comprising in response to detecting an overflow or underflow condition, selecting replacing the result number with a constant value.

4. The method of claim 1, wherein combining the plurality of intermediate products includes performing a first addition operation on a first subset of the plurality of intermediate products and performing a second addition operation of a second subset of the plurality of intermediate products different than the first subset.

5. The method of claim 1, wherein the second format comprises binary coded centimal, and the format native to the processor includes binary integer.

6. The method of claim 1, wherein converting the plurality of digits from the first format to the second format includes performing a shift operation to align a mantissa of the number.

7. The method of claim 1, wherein converting the plurality of digits from the first format to the second format includes clearing a particular digit in response to determining the particular digit is unused.

8. The method of claim 1, wherein the number is included in a database stored on the storage device.

9. An apparatus, comprising:
   a processor configured to receive a number in a first format having a plurality of digits, each of which is formatted with a first format, wherein the processor includes:

a conversion circuit configured to convert each digit of the plurality of digits from the first format to a second format that includes a plurality of converted digits;

a multiplier circuit configured to generate a plurality of intermediate products using the plurality of converted digits; and a plurality of carry-save adder circuits configured to combine the plurality of intermediate products to generate a result number formatted with a format native to the processor.

10. The apparatus of claim 9, wherein the processor further includes a complement circuit configured to perform a two's complement operation on the result number in response to a determination that the number is less than zero.

11. The apparatus of claim 9, wherein the processor further includes a multiplex circuit configured to replace the result number with a constant value in response to detecting an overflow or underflow condition.

12. The apparatus of claim 9, wherein the processor further includes an alignment circuit configured to perform a shift operation using the plurality of converted digits to align a mantissa of the number.

13. The apparatus of claim 9, wherein a first carry-save adder circuit of the plurality of carry-save adder circuits is configured to perform a first addition operation on a first subset of the plurality of intermediate products and a second carry-save adder circuit of the plurality of carry-save adder circuits is configured to perform a second addition operation of a second subset of the plurality of intermediate products different than the first subset.

14. The apparatus of claim 9, wherein the second format comprises binary coded centimal, and the format native to the processor includes binary integer.

* * * * *

UNITED STATES PATENT AND TRADEMARK OFFICE
CERTIFICATE OF CORRECTION

PATENT NO. : 10,228,939 B2
APPLICATION NO. : 15/378701
DATED : March 12, 2019
INVENTOR(S) : Brooks et al.

Page 1 of 1

It is certified that error appears in the above-identified patent and that said Letters Patent is hereby corrected as shown below:

In the Drawings

On sheet 6 of 7, in FIG. 6, under Reference Numeral 603, Line 2, delete "instuction" and insert -- instruction --, therefor.

In the Specification

In Column 5, Line 45, delete "the a" and insert -- the --, therefor.

In the Claims

In Column 14, Line 31, in Claim 1, delete "generating, generating" and insert -- generating, --, therefor.

Signed and Sealed this
Twenty-fifth Day of February, 2020

Andrei Iancu
*Director of the United States Patent and Trademark Office*